(12) United States Patent
Luttinen et al.

(10) Patent No.: US 7,469,952 B2
(45) Date of Patent: Dec. 30, 2008

(54) LOW PROFILE SEAT STOWAGE MECHANIZATION

(75) Inventors: James L. Luttinen, Brighton, MI (US); Anthony A. Bane, Clay Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/749,362

(22) Filed: May 16, 2007

(65) Prior Publication Data

US 2008/0284196 A1  Nov. 20, 2008

(51) Int. Cl.
*B60N 2/02* (2006.01)

(52) U.S. Cl. ........................ 296/68.09; 296/66

(58) Field of Classification Search .............. 296/68.09, 296/65.16, 65.03, 65.05, 65.01, 65.11
See application file for complete search history.

(56) References Cited

U.S. PATENT DOCUMENTS

| 2,826,241 | A | * | 3/1958 | Himka | 296/65.09 |
|---|---|---|---|---|---|
| 2,926,948 | A | * | 3/1960 | Koplin et al. | 296/66 |
| 2,927,818 | A | * | 3/1960 | Ferrara | 296/66 |
| 3,311,405 | A | * | 3/1967 | Brennan et al. | 296/66 |
| 4,805,953 | A | * | 2/1989 | Yamauchi | 296/65.09 |
| 4,979,773 | A | * | 12/1990 | Eubank | 296/65.05 |
| 5,588,707 | A | * | 12/1996 | Bolsworth et al. | 296/66 |
| 6,070,934 | A | * | 6/2000 | Schaefer et al. | 296/65.09 |
| 6,347,834 | B1 | * | 2/2002 | Couasnon | 296/65.09 |
| 6,601,900 | B1 | * | 8/2003 | Seibold | 296/65.09 |
| 6,688,696 | B2 | * | 2/2004 | Brush et al. | 297/378.1 |
| 6,705,658 | B2 | * | 3/2004 | Jach et al. | 296/65.09 |
| 7,040,684 | B2 | * | 5/2006 | Tame et al. | 296/65.09 |
| 7,290,822 | B2 | * | 11/2007 | Villeminey | 296/65.09 |
| 7,300,107 | B2 | * | 11/2007 | Kammerer | 296/65.09 |
| 2002/0125753 | A1 | * | 9/2002 | Kammerer | 297/331 |
| 2002/0171282 | A1 | * | 11/2002 | Seibold et al. | 297/452.18 |
| 2004/0251705 | A1 | * | 12/2004 | Tame et al. | 296/65.09 |
| 2006/0001305 | A1 | * | 1/2006 | Christopher et al. | 297/331 |

* cited by examiner

*Primary Examiner*—Kiran B. Patel

(57) ABSTRACT

A seat stowage system for a vehicle having a spare tire tub comprises a seat assembly including a seatback cushion having an occupiable surface and an opposing cargo load surface and a base cushion having an occupiable surface and an underside surface. A translational joint assembly operatively connects the seatback cushion and the base cushion. The translational joint assembly allows the seat assembly to transition between an occupiable and a stowed position while utilizing the foot well and not interfering with or obstructing the spare tire tub.

5 Claims, 2 Drawing Sheets

LOW PROFILE SEAT STOWAGE MECHANIZATION

TECHNICAL FIELD

The present invention pertains generally to a seat stowage mechanization for a vehicle.

BACKGROUND OF THE INVENTION

Many vehicles have a cargo area located at the rear of the vehicle. The cargo area is often located rearward of the passenger seating compartment. The last row of seats in the passenger seating compartment is typically configured to be removable or stowable to expand the cargo area.

Removable seating assemblies maximize cargo space when removed. Removable seating assemblies are also advantageous because a flat vehicle floor may be exposed when the seating assembly is removed, thereby facilitating cargo loading and increasing cargo stability during transportation.

However, removal of a seating assembly from the vehicle to increase the cargo area also has some disadvantages. Seating assemblies may be heavy or awkward and may therefore require significant physical exertion to remove from the vehicle. Moreover, the vehicle owner must have a safe place to store the seating assembly after it has been removed from the vehicle. The storage problem is exacerbated when the seating assembly needs to be removed to load cargo at a remote location where the vehicle owner does not have a safe place to store the seating assembly.

The prior art also includes seating assemblies that are stowable within a vehicle adjacent a spare tire tub. For example, some seating assemblies have a seatback that rotates forward to lie horizontally above a seat cushion, and the exposed surface of the folded seatback serves as the cargo floor; but the seat cushion or stowage mechanism may interfere with the spare tire tub when the seating assembly is in the stowed position. Moreover, the vertical cargo space may not be optimized because the seatback may not rest horizontally upon the vehicle floor, but instead rests at an angle that reduces the vertical cargo space.

SUMMARY OF THE INVENTION

A seat stowage system includes a seat assembly with a seatback cushion having an occupiable surface and an opposing cargo load surface and a base cushion having an occupiable surface and an underside surface. A translational joint assembly operatively connects the seatback cushion and the base cushion. The translational joint assembly includes a link having a first end and a second end, the first end of the link being pivotally connected to the seatback cushion. The translational joint assembly further includes a hinge having a first end and a second end, the first end of the hinge being pivotally connected to the second end of the link; a translational sleeve, the translational sleeve operatively connected to the second end of the hinge; a translational rod, the translational sleeve being slidably engaged with the translational rod; and a support rod, the support rod having a first end being connected to the translational rod and a foot well, and a second end being connected to the underside of the base cushion. The translational joint assembly allows the seat assembly to transition between an occupiable and a stowed position.

In a further embodiment, the seat stowage system includes a spare tire tub located adjacent a cargo compartment. The translational joint assembly moves the seatback cushion and the base cushion with respect to the foot well and the spare tire tub in either an upward and rearward direction or forward and downward direction, thereby allowing the passenger seat assembly to translate between the occupiable and stowed positions in a manner compatible with the spare tire tub.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
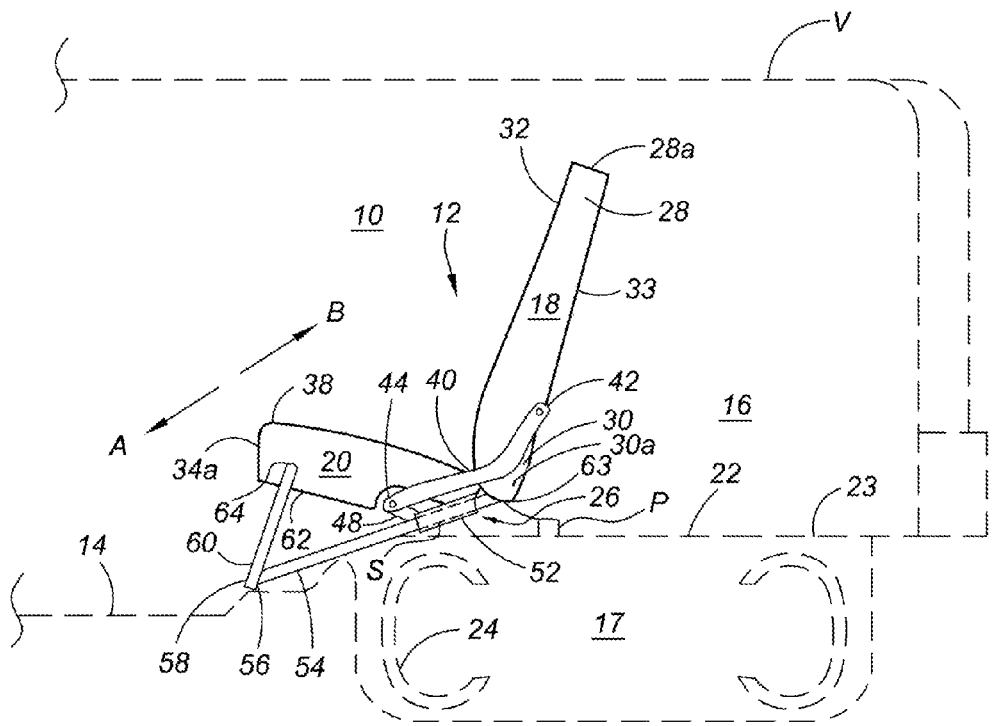
FIG. 1 is a schematic side view illustrating a rear seat having a rear seat stowage mechanism adjacent a spare tire tub, with the rear seat in a raised position and the rear seat stowage mechanism in an extended position compatible with the spare tire tub.

Referring to the Figures, wherein like reference numbers refer to like components throughout the several figures, FIG. 1 illustrates a side view of a rear passenger compartment 10 of a motor vehicle V. The rear passenger compartment 10 includes, amongst other features, a seat stowage system or a rear passenger seat assembly 12, a foot well 14, a cargo compartment 16, and a spare tire tub 17 substantially adjacent the foot well 14. It can be appreciated that the rear passenger seat assembly 12 may be a third row seat system that can typically accommodate seating at least three people. The foot well 14 is generally located forward of the rear passenger seat assembly 12, or closer to the front of the vehicle V, while the cargo compartment 16 is located rearward of the rear passenger seat assembly 12, or closer to the back of the vehicle V. The spare tire tub 17 generally includes a removable or otherwise repositionable cover 22, that may also act as part of a floor or a load surface 23 for the cargo compartment 16 and which may be removed to allow access to a spare tire 24 in the spare tire tub 17.

The seat stowage system or rear passenger seat assembly 12 may include at least one seatback cushion 18, at least one base cushion 20 and at least one translational joint assembly 26. When the passenger seat assembly 12 is in an upright or occupatiable position, as in FIG. 1, the seatback cushion 18 is generally vertically upright, extending from an upper extent surface 28a of an upper extent 28 to a lower extent surface 30a of a lower extent 30; and with an occupiable surface 32 that generally faces a forward direction, or toward the front of the vehicle V, and an opposing cargo load surface 33 that generally faces the cargo compartment 16. The upper extent surface 28a is generally facing toward the top of the vehicle, while the lower extent surface 30a is generally facing toward the load surface 23. The base cushion 20 is generally at a slight upward angle from the load surface 23 of the cargo compartment, extending from a forward extent surface 34a of a forward extent 34 to a rear extent surface 36a of a rear extent 36, and with an occupiable surface 38 that generally faces in an upward direction.

As illustrated, when the rear passenger seat assembly 12 is in the upright position, the occupiable surfaces 32, 38 of the seatback cushion 18 and the base cushion 20, respectively, are generally orthogonal with respect to each other. When seated, an occupant of the vehicle may rest against occupiable surfaces 32, 38 of the seatback cushion 18 and the base cushion 20, respectively. To provide occupant comfort, the occupiable surfaces 32, 38 may be a soft, pliant material such as leather or fabric.

Figure 3:
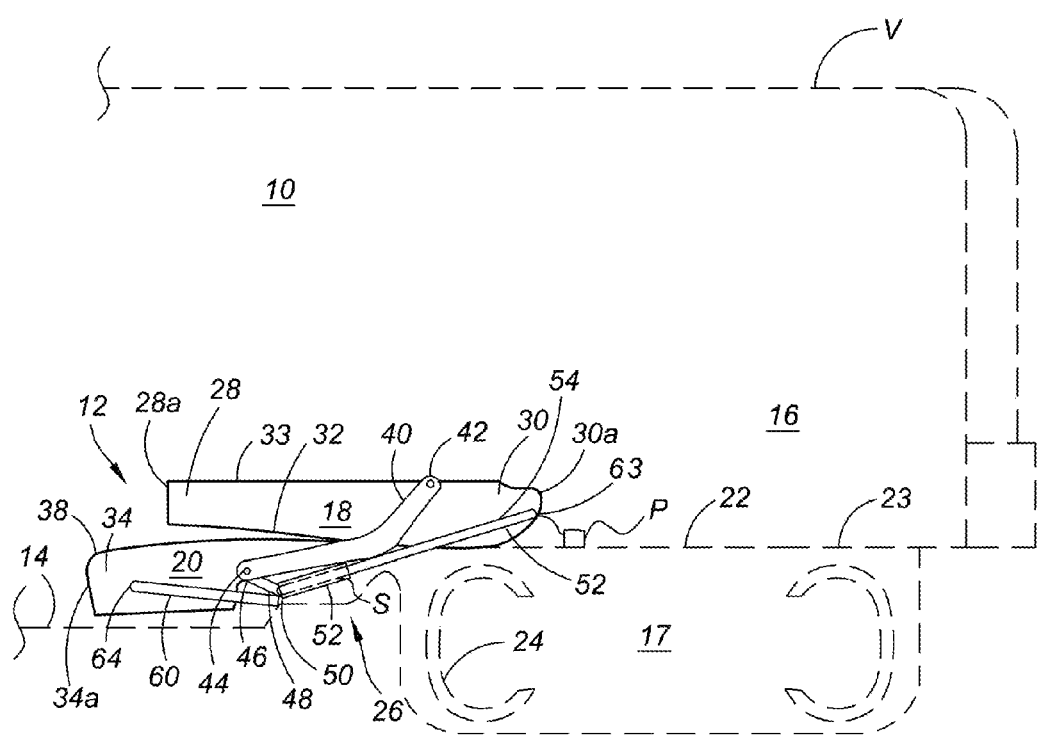
FIG. 3 is a schematic side view illustrating the rear seat in a stowed position and the rear seat stowage mechanism in a stowed position compatible with a spare tire tub.

When the passenger seat assembly 12 is in a folded or stowed position, as illustrated in FIG. 3, the seatback cushion 18 is generally horizontal, with the upper extent surface 28a generally facing toward the front of the vehicle, the lower extent surface 30a generally facing toward the rear of the vehicle, and the occupiable surface 32 generally facing toward the foot well 14. The base cushion 20 is generally horizontal, with the forward extent surface 34a generally facing toward the front of the vehicle, the rear extent surface 36a generally facing toward the rear of the vehicle, and the occupiable surface 38 generally facing upward.

The occupiable surfaces 32, 38 of the seatback cushion 18 and base cushion 20, respectively, are generally parallel and in close proximity with respect to each other. As illustrated, the base cushion 20 is substantially tucked within the foot well 14, while the seatback cushion 18 substantially overlays, or covers, the base cushion 20. The cargo load surface 33 of the seatback cushion 18 faces upward and forms another part of the load surface such as 23 of the cargo compartment 16.

Figure 2:
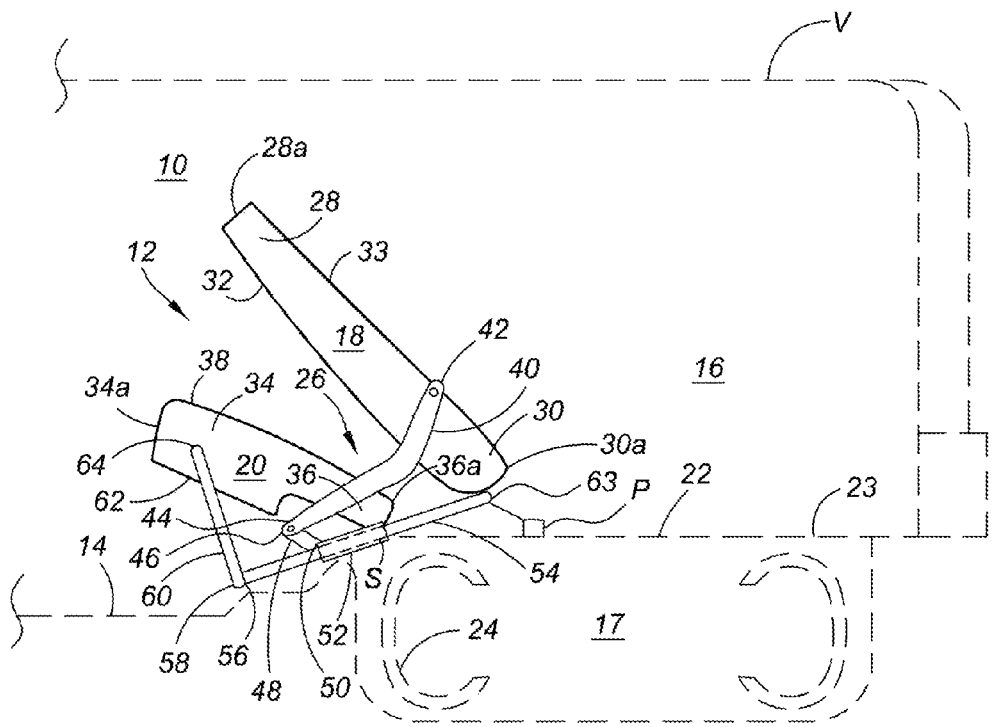
FIG. 2 is a schematic side view illustrating the rear seat in an intermediate position and the rear seat stowage mechanism in a translational position.

FIG. 2 illustrates the passenger seat assembly 12 in an intermediate position. While only one intermediate position is illustrated, it can be appreciated that the passenger seat assembly 12 may transition between several intermediate positions as it moves or translates between the occupiable and stowed positions. The translational joint assembly 26 operatively connects the seatback cushion 18 and the base cushion 20 and allows both to articulate as the passenger seat assembly 12 moves between the occupiable and stowed positions. With respect to FIGS. 1 and 2, as the passenger seat assembly 12 transitions between several intermediate positions, the base cushion 20 may move in a forward and downward direction, as illustrated in the direction of arrow A, or in an upward and rearward direction, as illustrated in the direction of arrow B; the seatback cushion 18 may generally pivot about the lower extent 30 such that the upper extent 28 of the seatback cushion 18 moves between being directed upwards and being directed forward, or toward the front of the vehicle V.

The translational joint assembly 26 may include a link 40 that is pivotally connected at a first end 42 to the seatback cushion 18, and pivotally connected at an opposing second end 44 to a first end 46 of a hinge 48. As illustrated, link 40 has a shape similar to a boomerang, however, link 40 may be any size and shape so long as the seatback cushion 18 and the base cushion 20 are operatively connected, and the passenger seat assembly 12 may transition between the occupiable and stowed positions.

An opposing second end 50 of hinge 48 may be fixedly connected to a translational sleeve 52. The translational sleeve 52 may slidingly engage a translational rod 54 to slide back and forth thereon. A first end 56 of the translational rod 54 may be pivotally connected to a first end 58 of a support rod 60 at the foot well 14, and a second end 63 of translational rod 54 may be pivotally connected to the lower extent 30 of the seatback cushion 18. As illustrated, the translational rod 54 is positioned at an angle relative to the foot well 14, the spare tire tub 17 and the load surface 23. Significantly, as the translational joint assembly 26 translates the seat back cushion 18 and the base cushion 20 between the occupiable and stowed positions, access to the spare tire tub 17 or the tire 24 in the spare tire tub 17 is not impeded. In other words, translational joint assembly 26 may not interfere with the spare tire tub 17.

In particular, the first end 58 of the support rod 60 may also be pivotally connected to the vehicle floorboard portion of the foot well 14, while a second end 64 of the support rod 60 may be pivotally connected to an underside or lower portion 62 of base cushion 20. The support rod 60 may provide additional support for any seat loads. It can be appreciated that each of the members in the translational joint assembly may be connected by any conventional means, including, for example, a nut and bolt assembly so long as each of the members may rotate and pivot with respect to each other as described in detail below.

In an embodiment, the translational sleeve 52 may be a hollow cylinder that slidingly engages the translational rod 54 by enclosing or surrounding the translational rod 54. An inner member S may be secured to the translational sleeve 52 through threaded engagement and may slidingly engage translational rod 54 by bearings (not shown). In such a situation, the translational joint assembly 26 may be connected to an electrical motor P to electronically rotate, move or translate the translational sleeve 52 along a substantial length of the translational rod 54. To carry out the translation, the occupant may activate a button (not shown) or engage a lever (not shown) to translate the passenger seat assembly 12.

Referring to FIG. 1, when the passenger seat assembly 12 is in the occupiable position, a releasable latch or lock (not shown) may be engaged to keep the passenger seat assembly 12 in the occupiable position until the occupant desires to move the passenger seat assembly 12 to the stowed position. When the button is activated, the releasable latch is released and the translational sleeve 52 may begin to translate along the length of the translational rod 54 in a downward and forward direction. The hinge 48, which is connected to the translational sleeve 52, also moves in a downward and forward direction, pulling along link 40. As link 40 moves, the seatback cushion 18 may be pulled forward and downward, until the upper extent surface 28a is generally facing toward the front of the vehicle and the cargo load surface is generally horizontal. At the same time, the support rod 60 generally pivots in a forward and downward direction, causing the base cushion 20 to also move generally in a forward and downward direction, until the forward extent surface 34a is generally facing the front of the vehicle and the base cushion 20 is substantially situated within the foot well 14.

In order to move the passenger seat assembly 12 from the stowed position to the occupiable position, the translational sleeve 52 may translate along the length of the translational rod 54 in an upward and rearward direction. The hinge 48 also moves in the upward and rearward direction, pushing along link 40. As link 40 moves, the seatback cushion 18 may be pushed upward and rearward, until the upper extent surface 28a is generally facing the top of the vehicle and the cargo load surface is generally facing the rear of the vehicle. At the same time, the support rod 60 generally pivots in an upward and rearward direction, causing the base cushion 18 to also move generally in an upward and rearward direction, until the front extent surface 34a is generally facing the front of the vehicle and the base cushion 20 is at a slight angle with respect to the load surface 23.

In an alternate embodiment, the translational sleeve 52 and translational rod 54 may form a sliding joint to be manually powered. In such a situation, the translational rod 54 may have a channel or a slot (not shown) that runs along a substantial portion of the length of the translational rod 54. The translational sleeve 52 may be fixedly engaged to the translational rod 54 such that the translational sleeve 52 may slide or move along the length of the slot. It can be appreciated that the translational sleeve 52 and the translational rod 54 may be fixedly secured together by any conventional means so long as the translational sleeve 52 can freely move along a substantial portion of the length of the translational rod 54.

To manually power the translational joint assembly 26 to transition the passenger seat assembly 12 between the occupiable and stowed positions, the occupant may apply a force to the upper extent 28 of the seatback cushion 18. For example, if the passenger seat assembly 12 is in the occupiable position, the occupant may apply a forward-directed force on the upper extent 28 to transition the passenger seat assembly 12 into the stowed position. Similarly, if the passenger seat assembly 12 is in the stowed position, the occupant may apply a rearward-directed force on the upper extent 28 to transition the passenger seat assembly 12 into the occupiable position. The remaining mechanisms of the translational joint assembly 26 move as described above to transition the passenger seat assembly 12 between the occupiable and stowed positions.

While the best modes for carrying out the invention have been described in detail, those familiar with the art to which this invention relates will recognize various alternative designs and embodiments for practicing the invention within the scope of the appended claims.

The invention claimed is:

1. A passenger seat assembly comprising: a seatback cushion extending from an upper extent surface to a lower extent surface; a base cushion extending from a forward extent surface to a rearward extent surface; and a translational joint assembly having a rearward portion operatively connecting the seat back cushion for movement with respect to the base cushion and a forward portion operatively connecting the base cushion for movement with respect to the seat back cushion to allow the passenger seat assembly to move between an occupiable and a stowed position; wherein the base cushion moves in a forward and downward direction as the passenger seat assembly transitions into the stowed position and in an upward and rearward direction as the passenger seat assembly transitions into the occupiable position; wherein the translational joint assembly includes: a link having a first end and a second end, the first end of the link being pivotally connected to the seatback cushion, a hinge having a first end and a second end, the first end of the hinge being pivotally connected to the second end of the link, a translational sleeve operatively connected to the second end of the hinge, a translational rod, the translational sleeve being slidably engaged to the translational rod, and a support rod having a first end being pivotally connected to the translational rod, and a second end being pivotally connected to an underside of the base cushion; wherein the translational sleeve translates along a substantial portion of the translational rod when the passenger seat assembly moves between the occupiable and stowed positions.

2. The passenger seat assembly as in claim 1, wherein the seatback cushion further includes an occupiable surface and an opposing cargo load surface and the base cushion further includes an occupiable surface and an underside surface, wherein the occupiable surface of the seat back cushion and the occupiable surface of 5 the base cushion are generally orthogonal with respect to each other when the passenger seat assembly is in the occupiable position.

3. The passenger seat assembly as in claim 2, wherein when the passenger seat assembly is in the stowed position, the occupiable surface of the seat back cushion and the occupiable surface of the base cushion are generally parallel with respect to each other, the cargo load surface is generally facing in an upward direction 5 and the base cushion is substantially located within a foot well.

4. The passenger seat assembly as in claim 1, wherein the translational sleeve and translational rod form a sliding joint to manually transition the seat assembly between the occupiable and stowed positions.

5. The passenger seat assembly as in claim 1, further including an inner member operatively engaged between the translational sleeve and the translational rod, and an electric motor operatively connected to the translational joint assembly, wherein the electric motor moves the inner member along a substantial portion of the 5 translation rod to move the seat assembly between the occupiable and stowed positions.

* * * * *